(12) United States Patent
Rud et al.

(10) Patent No.: US 11,067,520 B2
(45) Date of Patent: Jul. 20, 2021

(54) PROCESS FLUID TEMPERATURE MEASUREMENT SYSTEM WITH IMPROVED PROCESS INTRUSION

(71) Applicant: Rosemount Inc., Shakopee, MN (US)

(72) Inventors: Jason H Rud, Mayer, MN (US); Steven R Trimble, Prior Lake, MN (US)

(73) Assignee: Rosemount Inc., Shakopee, MN (US)

( * ) Notice: Subject to any disclaimer, the term of this patent is extended or adjusted under 35 U.S.C. 154(b) by 385 days.

(21) Appl. No.: 15/196,569

(22) Filed: Jun. 29, 2016

(65) Prior Publication Data

US 2018/0003655 A1    Jan. 4, 2018

(51) Int. Cl.
| | |
|---|---|
| *G01N 25/18* | (2006.01) |
| *G01K 13/02* | (2021.01) |
| *G01K 1/024* | (2021.01) |
| *G01K 1/08* | (2021.01) |
| *G01K 1/14* | (2021.01) |

(Continued)

(52) U.S. Cl.
CPC .............. *G01N 25/18* (2013.01); *G01K 1/024* (2013.01); *G01K 1/08* (2013.01); *G01K 13/02* (2013.01); *G01K 17/00* (2013.01)

(58) Field of Classification Search
CPC .......... G01K 17/20; G01K 13/02; G01K 7/02; G01K 17/06; G01K 17/08; G01K 17/10; G01K 17/12; G01N 25/4866
See application file for complete search history.

(56) References Cited

U.S. PATENT DOCUMENTS

| | | |
|---|---|---|
| 3,724,267 A | 4/1973 | Zoschak |
| 4,186,605 A | 2/1980 | Bourigault |
| 4,384,793 A | 5/1983 | O'Brien |

(Continued)

FOREIGN PATENT DOCUMENTS

| | | |
|---|---|---|
| CN | 203432706 U | 2/2014 |
| DE | 4101549 A | 7/1992 |

(Continued)

OTHER PUBLICATIONS

Search Report Written Opinion for International Patent Application No. PCT/US2017/037222, dated Sep. 8, 2017, 15 pages.

(Continued)

*Primary Examiner* — Peter J Macchiarolo
*Assistant Examiner* — Anthony W Megna Fuentes
(74) *Attorney, Agent, or Firm* — Christopher R. Christenson; Kelly, Holt & Christenson PLLC (57) ABSTRACT

A process fluid temperature measurement system includes a thermowell configured to couple to a process fluid conduit and extend through a wall of the process fluid conduit. A temperature sensor assembly is disposed within the thermowell and includes a first temperature sensitive element and a second temperature sensitive element. The first temperature sensitive element is disposed within the thermowell adjacent a distal end of the thermowell. The second temperature sensitive element is spaced apart from the first temperature sensitive element along a spacer having a known thermal conductivity. Transmitter circuitry is coupled to the first and second temperature sensitive elements and is configured to perform a heat flux calculation to provide a process fluid temperature output.

11 Claims, 6 Drawing Sheets

(51) Int. Cl.
*G01K 17/06* (2006.01)
*G01K 17/00* (2006.01)

(56) References Cited

U.S. PATENT DOCUMENTS

| | | | |
|---|---|---|---|
| 4,436,438 | A | 3/1984 | Voznick |
| 4,467,134 | A * | 8/1984 | Pustell .................... G01K 13/02 |
| | | | 136/230 |
| 4,488,516 | A | 12/1984 | Bueters |
| 4,527,908 | A | 7/1985 | Arisi |
| 4,722,610 | A | 2/1988 | Levert |
| 4,826,540 | A | 5/1989 | Mele |
| 5,064,604 | A | 11/1991 | Barton |
| 5,743,646 | A | 4/1998 | O'Connell |
| 6,485,174 | B1 | 11/2002 | Albrecht |
| 6,503,221 | B1 | 1/2003 | Briggs |
| 6,824,305 | B1 | 11/2004 | Boyd |
| 6,848,373 | B2 | 2/2005 | Breen |
| 7,220,050 | B2 | 5/2007 | Esprimont |
| 7,249,883 | B2 | 7/2007 | Kuroda |
| 7,249,885 | B2 | 7/2007 | Van Den Ende |
| 7,395,173 | B2 | 7/2008 | Kautz |
| 7,789,554 | B2 | 9/2010 | Sattler |
| 8,057,093 | B2 | 11/2011 | Sattler |
| 8,092,085 | B2 | 1/2012 | Kawase |
| 8,280,674 | B2 | 10/2012 | Schwerer |
| 8,308,349 | B1 | 11/2012 | Feller |
| 8,591,102 | B2 | 11/2013 | Frach |
| 8,671,890 | B2 | 3/2014 | Davidson |
| 8,851,744 | B1 * | 10/2014 | Feller .................... G01K 15/005 |
| | | | 374/1 |
| 8,851,745 | B2 | 10/2014 | Sakami |
| 9,360,377 | B2 | 6/2016 | Converse |
| 2005/0038172 | A1 * | 2/2005 | Nimberger ............. C08L 79/08 |
| | | | 524/495 |
| 2006/0050767 | A1 | 3/2006 | Fleming |
| 2008/0083446 | A1 | 4/2008 | Chakraborty |
| 2009/0110023 | A1 | 4/2009 | Clark, Jr. |
| 2010/0246630 | A1 | 9/2010 | Kaszynski |
| 2010/0316086 | A1 | 12/2010 | Engelstad |
| 2012/0128024 | A1 | 5/2012 | Tsuchida |
| 2016/0097684 | A1 * | 4/2016 | Funahashi ................ G01K 7/02 |
| | | | 374/179 |

FOREIGN PATENT DOCUMENTS

| | | | | |
|---|---|---|---|---|
| DE | 102010030076 A1 * | 12/2011 | ............... | G01K 1/16 |
| DE | 2500034 A | 6/2013 | | |
| EP | 1079219 A2 * | 2/2001 | ............ | G01K 13/02 |
| GB | 2500034 A1 | 9/2013 | | |
| WO | WO 91/14161 A1 | 9/1991 | | |

OTHER PUBLICATIONS

"Rosemount 0085 Pipe Clamp Sensor," Product Data Sheet 00813-0100-4952, Mar. 2016, pp. 1-16.
International Searching Authority, International Search Report and Written Opinion for International Application PCT/US2014/067243, dated Feb. 27, 2015, 8 pages.
First Office Action dated Mar. 29, 2019 for Chinese patent application No. 201710049532.8, 9 pages including English translation.
Russian Office Action dated Jul. 16, 2019, for Russian Patent Application No. 20191022184, 14 pages including English translation.
Second Office Action for Chinese Patent Application No. 201710049632.8 dated Nov. 4, 2019, 17 pages with English Translation.
Office Action for Canadian Patent Application No. 3029201 dated Nov. 18, 2019, 6 pages.
Extended European Search Report for European Patent Application No. 17820891.4 dated Jan. 16, 2020, 9 pages.
First Office Action dated Mar. 17, 2020 for Japanese Patent Application No. 2018-565387, 10 pages including English translation.
Canadian Second Office Action dated Jul. 31, 2020 for Canadian Patent Application 3029201, 6 pages.
Third Chinese Office Action dated Aug. 5, 2020 for Chinese Patent Application 201710049532.8, 17 pages including English Translation.
First Examination Report for Indian Patent Application No. 201827044928 dated Jan. 5, 2021, 5 pages.
Decision of Rejection for Japanese Patent Application No. 2018-565387 dated Mar. 2, 2021, 11 pages.

* cited by examiner

Process Fluid (T) = S2 + (S2-S1) * $R_{twell}/R_{snsr}$

PROCESS FLUID TEMPERATURE MEASUREMENT SYSTEM WITH IMPROVED PROCESS INTRUSION

BACKGROUND

The process industry employs process variable transmitters to monitor process variables associated with substances such as solids, slurries, liquids, vapors, and gases in chemical, pulp, petroleum, pharmaceutical, food, and other fluid processing plants. Process variables include pressure, temperature, flow, level, turbidity, density, concentration, chemical composition, and other properties.

A process fluid temperature transmitter provides an output related to a process fluid temperature. The temperature transmitter output can be communicated over a process control loop to a control room, or the output can be communicated to another process device such that the process can be monitored and controlled.

Traditionally, process fluid temperature transmitters were coupled to or employed thermowells which thermally couple a temperature sensor to a process fluid, but otherwise protect and isolate the temperature sensor from direct contact with the process fluid. The thermowell is positioned within the process fluid in order to ensure substantial thermal contact between the process fluid and the temperature sensor disposed therein.

Thermowells are typically designed using relatively robust metal structures such that the thermowell can withstand a number of challenges provided by the process fluid. Such challenges can include physical challenges, such as process fluid flowing past the thermowell at a relatively high rate; thermal challenges, such as extremely high temperatures; pressure challenges, such as process fluid being conveyed or stored at a high pressure; and chemical challenges, such as those provided by a caustic process fluid.

There are a number of factors that increase the difficulty of working with thermowells in process fluid measurement systems. One issue is that thermowells are intrusive and invasive to the process fluid system. This is because the thermowell must extend through a wall of a process fluid conduit, such as a pipe, in order to couple a temperature sensor to the process fluid. Additionally, thermowells typically require regular evaluation for many related factors. Further, thermowells generally increase the response time for temperature measurement.

Thermowells are used in a number of environments for a variety of reasons. Thermowells provide a robust and effective conduit to allow a temperature sensor to be placed in thermal communication with a process fluid. Additionally, thermowells provide protection for the sensor capsule from materials flowing in the process fluid conduit that could easily bend, break, or erode the temperature sensor capsule. Moreover, thermowells allow the temperature capsule to be easily removed for calibration and replacement without having to shut down the process.

SUMMARY

A process fluid temperature measurement system includes a thermowell configured to couple to a process fluid conduit and extend through a wall of the process fluid conduit. A temperature sensor assembly is disposed within the thermowell and includes a first temperature sensitive element and a second temperature sensitive element. The first temperature sensitive element is disposed within the thermowell adjacent a distal end of the thermowell. The second temperature sensitive element is spaced apart from the first temperature sensitive element along a spacer having a known thermal conductivity. Transmitter circuitry is coupled to the first and second temperature sensitive elements and is configured to perform a heat flux calculation to provide a process fluid temperature output.

DETAILED DESCRIPTION

One design consideration for using thermowells in process fluid measurement systems is that the thermowells should generally be inserted into the process fluid with a length that is approximately one third of the pipe diameter in order to achieve the highest accuracy. The main reason for this design consideration is to reduce or minimize the influence on the temperature sensor element from the process fluid conduit temperature. Additionally, to achieve the desired insertion depth for large pipe diameters, longer thermal wells are needed. However, factors such as vortex shedding, material impacts, and water hammering become a larger concern in the strength of the thermowell. With this and other design considerations in mind, users typically require thermowell lengths specified with millimeter resolution thereby requiring manufactures of thermowells to maintain significant inventory in the various possible lengths of thermowells. Thermowells are typically made robust using a significant amount of material. While such robust designs improve thermowell longevity, they can slow the thermowell's responsiveness to a process temperature change. In some applications, a fast-changing temperature relates to a fault in the process such as a reaction runaway. In this case, it is very important to understand as soon as is feasible that this is occurring so that materials can be added to the process to slow the reaction. Accordingly, at least some embodiments described herein may reduce response time.

Figure 1:
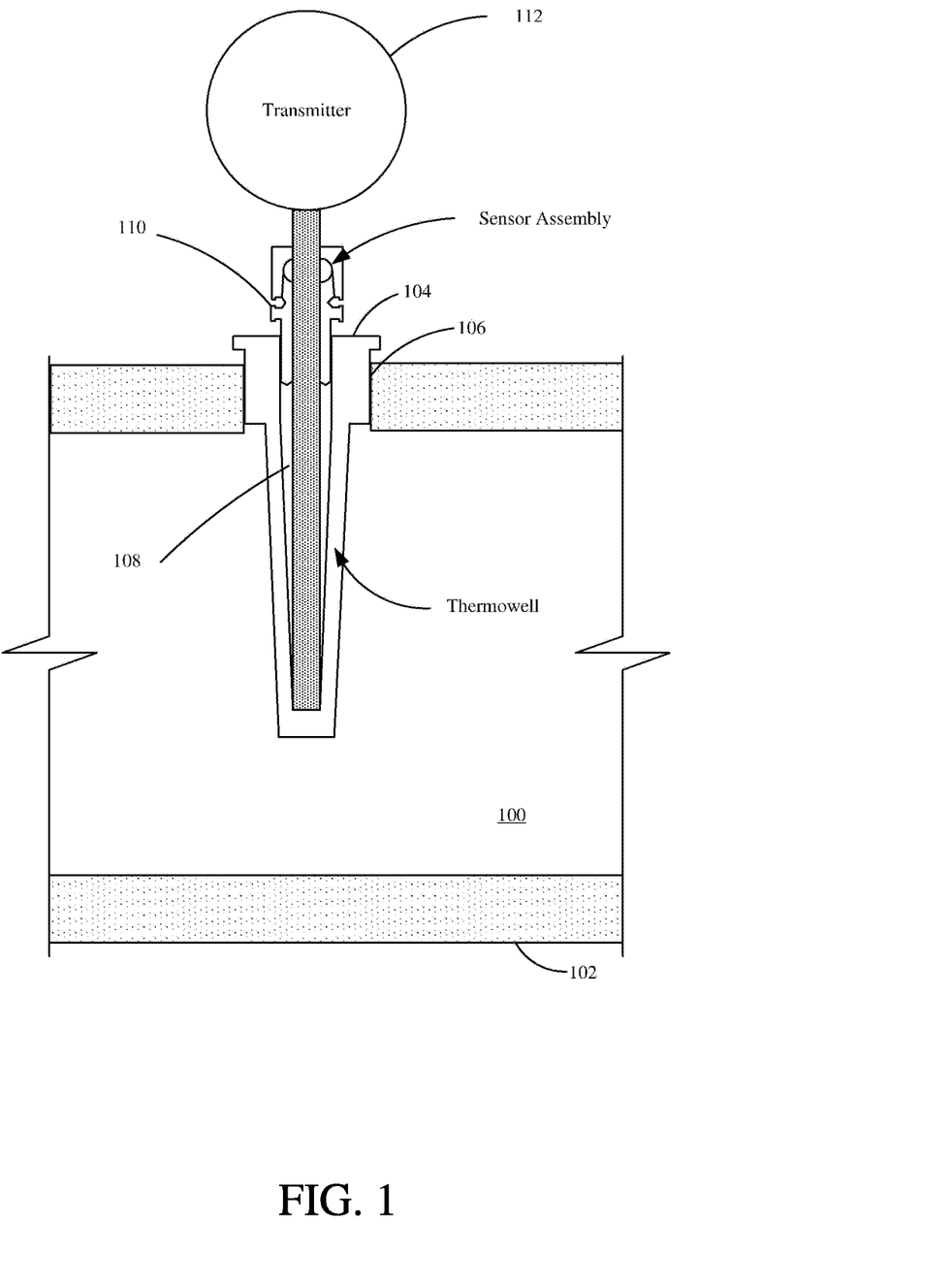
FIG. 1 is a diagrammatic view of a process fluid temperature measurement system coupled to a thermowell in accordance with the prior art.

FIG. 1 is a diagrammatic view of a process fluid temperature measurement system coupled to a thermowell in accordance with the prior art. As illustrated in FIG. 1, process fluid 100 flows through process fluid conduit 102. A thermowell 104 is mounted within an aperture 106 or process intrusion through the wall of conduit 102. Typically, thermowell 104 will have an externally threaded portion that engages internal threads of aperture 106 to form a robust coupling. However, in some implementations that the thermowell may be welded to the pipe wall, or coupled thereto using other arrangements, such as a pair of mating flanges and a gasket. Regardless, thermowell 104 is generally formed of a robust material such as stainless steel, and has an internal chamber 108 that is sized to allow temperature sensor assembly 110 to extend to therein. Temperature sensor assembly 110 includes a temperature sensor that is positioned within thermowell 104 in order to measure the temperature of process fluid 100.

Figure 2:
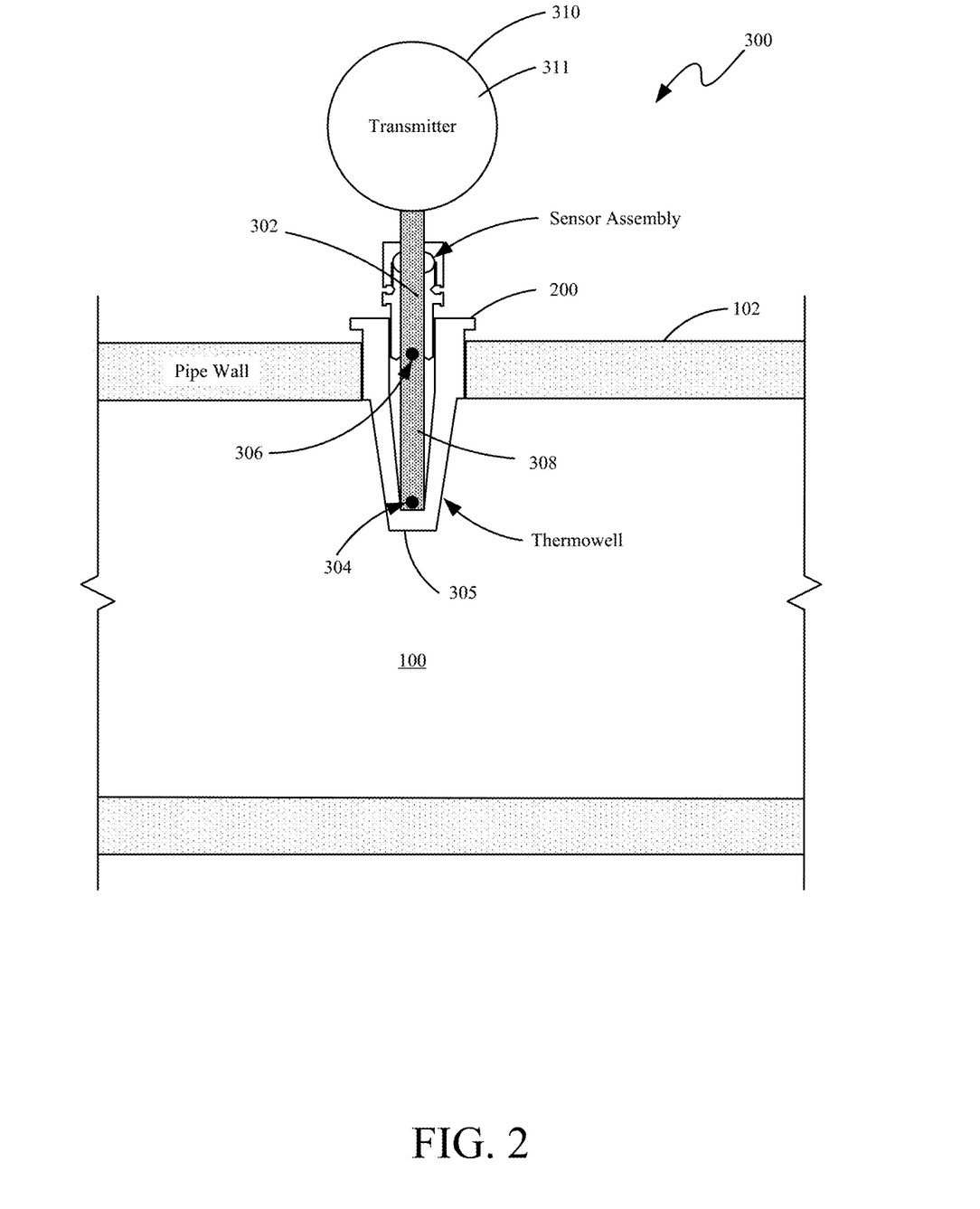
FIG. 2 is a diagrammatic view of a process fluid temperature measurement system in accordance with an embodiment of the present invention.

FIG. 2 is a diagrammatic view of a process fluid temperature measurement system in accordance with another embodiment of the present invention. Process fluid temperature measurement system 300 includes a thermowell 200 coupled to conduit wall 102. Thermowell 200 is relatively short (in comparison to thermowell 104 shown in FIG. 1) and is mechanically coupled directly to pipe wall 102. As shown in FIG. 2, system 300 includes temperature sensor assembly 302 that includes a plurality of temperature sensitive elements 304, 306. Temperature sensitive elements 304, 306 can be formed of any suitable temperature sensing devices. The temperature sensitive elements can be any suitable device or apparatus that has an electrical characteristic that varies with temperature. Suitable examples include resistance temperature devices (RTDs), thermistors, thermocouples, or other suitable devices. The temperature sensitive elements 304, 306 of sensor assembly 302 are generally coupled to transmitter circuitry 311 within transmitter housing 310. The transmitter circuitry (described below) is generally configured to measure or otherwise detect the electrical property of the temperature sensitive elements 304, 306 and generate a process fluid temperature output related to the measured temperatures.

The output from process fluid temperature measurement system can be provided over a process communication loop, such as a 4-20 milliamp loop, or provided digitally, such as in accordance with the Highway Addressable Report Transducer (HART®). Other examples of process communication protocols include the Profibus-PA Communication Protocol and the FOUNDATION™ Fieldbus Protocol. Further still, suitable wireless technologies can be used in addition to or in place of a wired process communication protocol. One example of a suitable wireless process communication protocol is that in accordance with the WirelessHART standard (IEC 62591).

Figure 3:
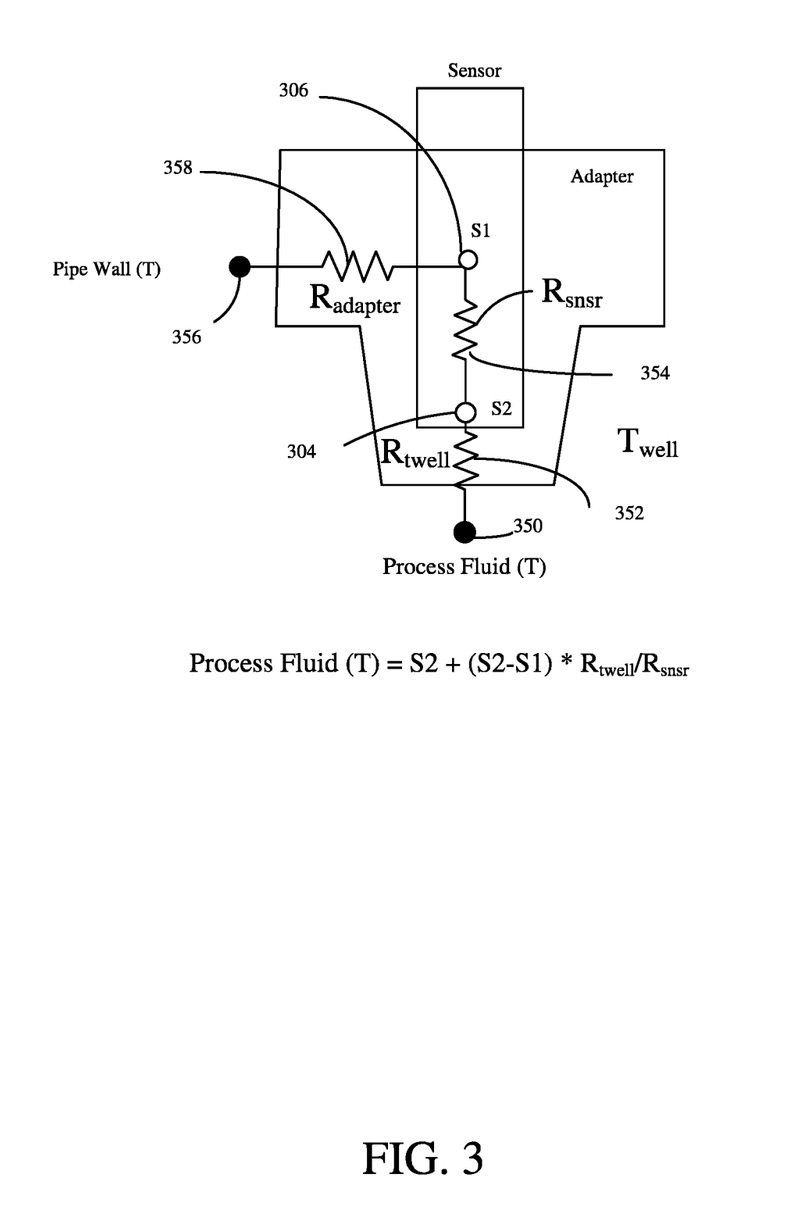
FIG. 3 is a diagrammatic view of heat conduction modeled using resistive components.

As shown in FIG. 2, temperature sensitive element 304 is disposed adjacent a distal end 305 of thermowell 200 and temperature sensitive element 306 is spaced apart from temperature sensitive element 304 along sensor assembly 302 by element 308 having a known or relatively constant thermal conductivity. By placing more than one temperature sensitive element in sensor assembly 302 at different locations spaced by spacer 308, electronics 311 within transmitter housing 310 can use a heat flux measurement to infer the temperature of process fluid 100. As shown in FIG. 2, temperature sensitive elements 304, and 306 are separated in temperature capsule 302 by spacer 308 and placed at locations that are significantly impacted by both pipe wall temperature and process fluid temperature. As used herein, a "spacer" is any physical structure or arrangement that controls or sets a distance and thermal conductivity between two elements. Accordingly, a spacer may be formed of a solid, a powder, such as Magnesium Oxide powder, or even an air gap. Any change on temperature sensor element 306 will also affect the temperature at temperature sensitive element 304 and vice versa. Given this correlation, the heat flux calculation can be simplified to what is shown in FIG. 3. While FIG. 2 shows thermowell 200 extending into process fluid conduit 102, it is noted that heat flux measurement can be performed effectively for embodiments where the thermowell does not protrude into the process vessel or conduit whatsoever.

FIG. 3 is a diagrammatic view of heat conduction modeled using resistive components. Specifically, the heat of process fluid 100, shown at node 350, flows to node S2 at temperature sensitive element 304 through the thermal impedance of the thermowell as indicated diagrammatically at $R_{twell}$ 352. Then, the heat flows along spacer element 308 to node S1 where the temperature is sensed by temperature sensitive element 306. The thermal impedance through spacer 308 is modeled diagrammatically as $R_{snsr}$ 354. Finally, heat at node S1 may flow to or from pipe wall 102 indicated at node 356. The thermal impedance from node S1 to pipe wall node 356 is illustrated diagrammatically as $R_{adapter}$ 358. Given these quantities, the temperature of process fluid is equal to the temperature measured at temperature sensitive element 304 plus the difference between the temperature measured at element 304 and 306 multiplied by $R_{twell}/R_{snsr}$.

Figure 4:
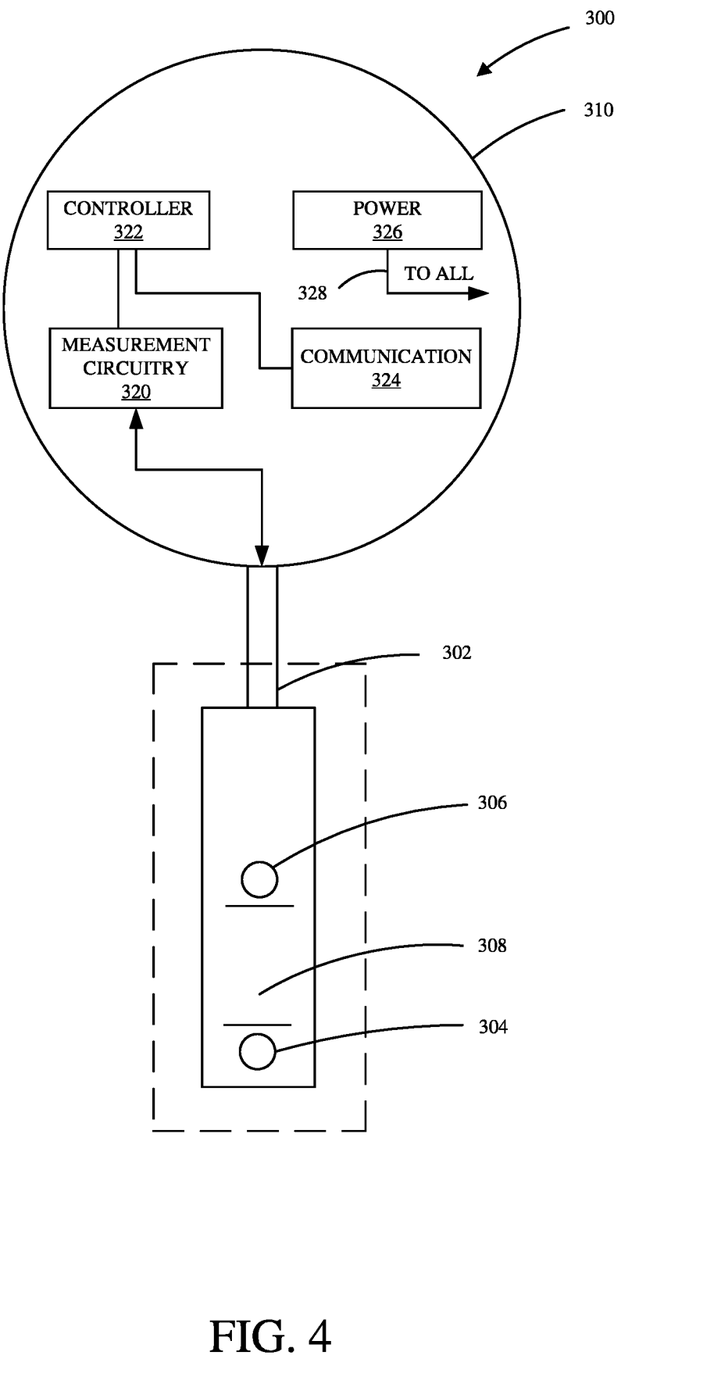
FIG. 4 is a diagrammatic view of a process fluid temperature measurement system in accordance with an embodiment of the present invention.

FIG. 4 is a diagrammatic view of the process fluid temperature measurement system shown in FIGS. 2 and 3. Specifically, sensor assembly 302 includes temperature sensitive elements 304, 306 that are separated by spacer 308. Each of temperature sensitive elements 304, 306 is operably coupled to measurement circuitry 320 within transmitter housing 310. Measurement circuitry 320 generally includes any suitable arrangement of electrical circuits that are able to engage each of temperature sensitive elements 304 and 306 to measure the temperature-sensitive electrical property thereof. Measurement circuitry 320 can include one or more analog-to-digital converters as well as suitable switching circuitry, such as a multiplexer. Additionally, measurement circuitry 320 can also include any suitable linearization and/or amplification circuitry. Measurement circuitry 320 generally provides a digital indication of the electrical properties of temperature sensitive elements 304, 306 to controller 322. In one embodiment, controller 322 may be a microprocessor or microcontroller, or any other suitable circuitry that is able to receive the digital indications from measurement circuity 320 and execute the heat flux calculation described with respect to FIG. 3. Additionally, as shown in FIG. 4, controller 322 is coupled to communication module 324.

Communication module 324 allows the temperature measurement system to communicate the process fluid temperature output over a process communication loop. As set forth above, suitable examples of process communication loop protocols include the 4-20 milliamp protocol, HART®, FOUNDATION™ Fieldbus Protocol, and WirelessHART (IEC 62591). Process fluid temperature measurement system 300 also includes power supply module 326 that provides power to all components of the system as indicated at arrow 328. In embodiments where the process fluid temperature measurement system is coupled to a wired process communication loop, such as a HART® loop, or a FOUNDATION™ Fieldbus process communication segment, power module 326 may include suitable circuitry to condition power received from the loop to operate the various components of system 300. Accordingly, in such wired process communication loop embodiments, power supply module 326 may provide suitable power conditioning to allow the entire device to be powered by the loop to which it is coupled. In other embodiments, when wireless process communication is used, power supply module 326 may include a source of power, such as a battery and suitable conditioning circuitry.

Figure 5:
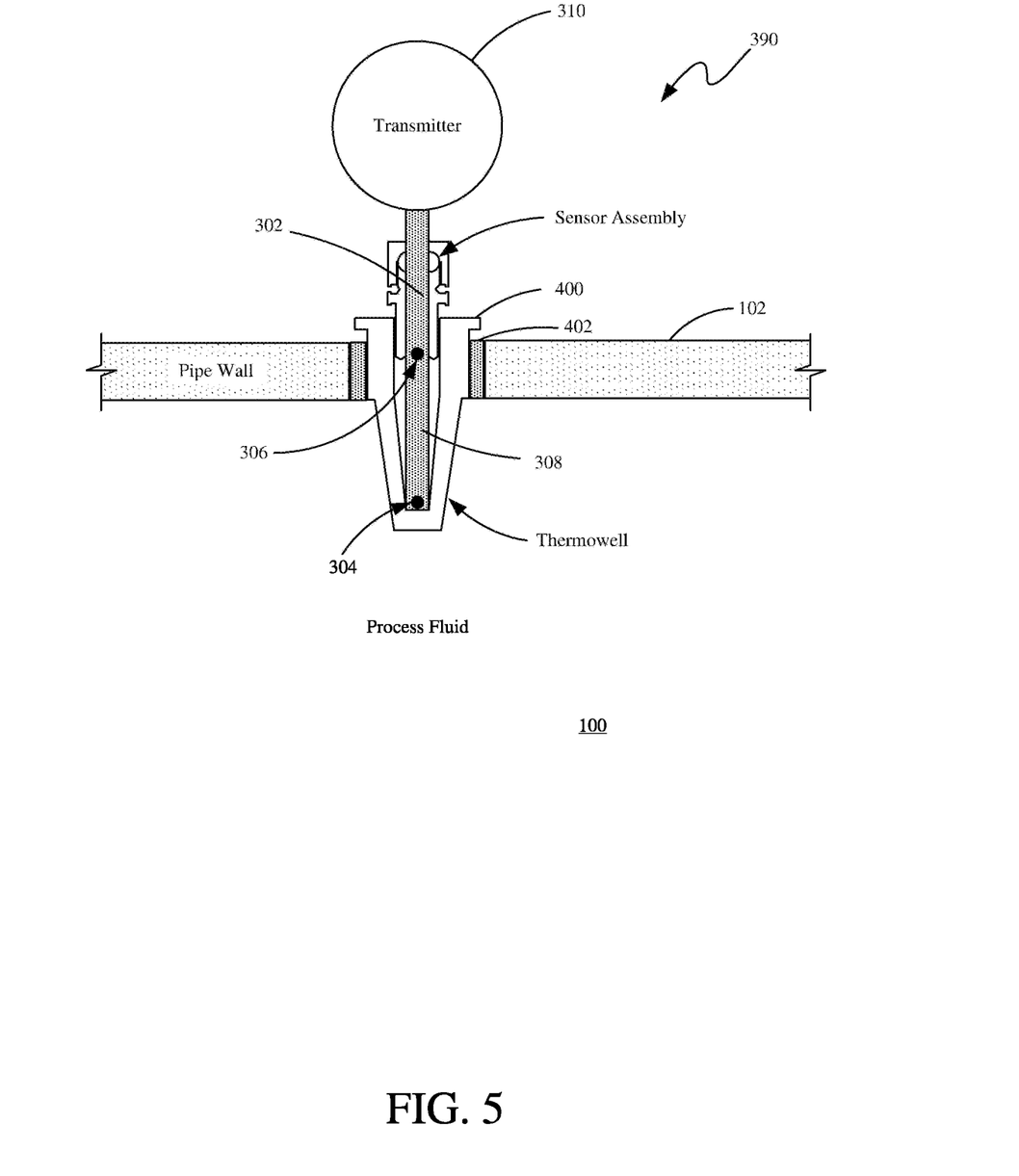
FIG. 5 is a diagrammatic view of the process fluid temperature measurement system in accordance with an embodiment of the present invention.

FIG. 5 is a diagrammatic view of a process fluid temperature measurement system 390 in accordance with an embodiment of the present invention. As shown in FIG. 5, a thermowell 400 is mounted to and extends through pipe wall 102 into process fluid 100. In comparison to the arrangement shown in FIG. 1, thermowell 400 does not extend into the process fluid conduit nearly as far as thermowell 104. Part of this difference is enabled by the thermal insulation that is provided by collar 402. Collar 402 is configured to engage an internal surface of aperture 106. For example, collar 402 may include external threads that engage internal threads of aperture 106. Collar 402 then includes suitable internal structure to engage thermowell 400 to reliably and sealingly mount thermowell 400 to pipe wall 102. However, collar 402 is constructed from a material that reduces thermal conduction, in comparison to the material from which thermowell 400 is constructed. Using collar 402 around thermowell 400 allows the temperature from the process to propagate to the temperature sensor with reduced influence from conduit 102. By using a thermally resistive material between the stem of thermowell 400 and process conduit 102, the thermowell length can be reduced while still maintaining requisite measurement accuracy. The thermally-resistive material can be any suitable organic or inorganic material that is able to withstand the process fluid pressures involved, as well as provide suitable chemical resistance to the process fluid. Examples of suitable materials include ceramics as well as organic materials, such as polytetrafluoroethylene (PTFE). By providing collar 402 around thermowell 400, thermowell 400 will respond faster with a reduced mass, which will also significantly reduce the need for wake frequency calculations. Further still, it is believed that fewer such "short" thermowell sizes will be needed, in comparison to current commercially-available sizes, which are generally specified down to the millimeter. Additionally, a thermally-insulative material, such as a gasket, may also be disposed between a mounting flange of the thermowell and a pipe standoff.

Figure 6:
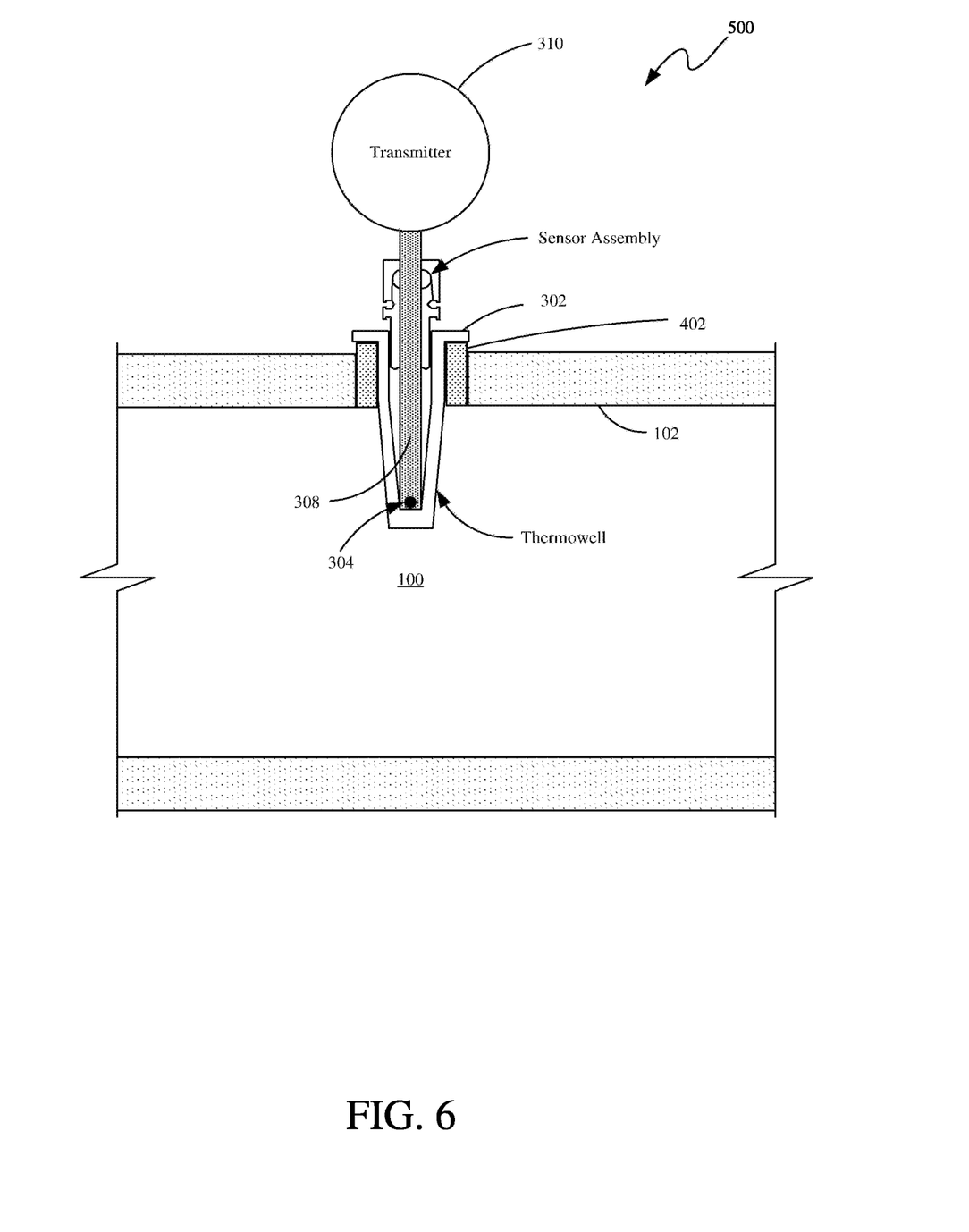
FIG. 6 is a diagrammatic view of a process fluid temperature measurement system in accordance with an embodiment of the present invention.

FIG. 6 is a diagrammatic view of a process fluid temperature measurement system in accordance with an embodiment of the present invention. Process fluid temperature measurement system 500 bears many similarities to system 390 (described with respect to FIG. 5), and like components are numbered similarly. The main difference between system 500 and system 390 is that system 500 has a sensor assembly that has a single temperature sensitive element 304. Thus, it is expressly contemplated that by using a thermally-insulative collar, such as collar 402, enough heat flow to/from the process fluid conduit may be prevented that a short (with respect to thermowell 104) thermowell may be used.

Although the present invention has been described with reference to preferred embodiments, workers skilled in the art will recognize that changes may be made in form and detail without departing from the spirit and scope of the invention. For example, while the heat flux measurement embodiment described with respect to FIGS. 2-4 is described with respect to a pair of temperature sensitive elements, those skilled in the art will recognize that additional temperature sensors may be employed within sensor assembly 302 for redundancy and/or added accuracy. Additionally, while the collar 402 is described as a thermally insulative collar, this description is merely in comparison to the material of thermowell 400. Thus, as long as the thermal conductivity of collar 402 is lower than that of thermowell 400, collar 402 maybe considered to be thermally insulative. Further still, it is expressly contemplated that the thermowell itself could be designed with a different alloy on the process conduit side that has a higher thermal impedance. In this way, the hot end of the thermal well stem can be highly thermally conductive in order to propagate heat from the process fluid to the sensor element. Moreover, a flange of the thermowell could be constructed using a relatively low thermal conductance that is attached to the thermowell stem having a higher thermal conductance in order to achieve the thermal isolation described herein.

What is claimed is:

1. A process fluid temperature measurement system comprising: a thermally-insulative collar configured to couple to a process fluid conduit wall; a thermowell configured to couple to the thermally-insulative collar and extend through the process fluid conduit wall; a temperature sensor assembly disposed within the thermowell, the temperature sensitive assembly including: a first temperature sensitive element, disposed within the thermowell, spaced from a wall of the thermowell; a second temperature sensitive element, disposed within the thermowell and contacting a distal end of the thermowell, spaced apart from the first temperature sensitive element along a spacer having a known thermal conductivity and formed of a powder; and transmitter circuitry including: measurement circuitry coupled to the first and second temperature sensitive elements; communication circuitry configured to communicate in accordance with a process communication protocol; and a microprocessor coupled to the measurement circuitry and the communication circuitry, the microprocessor being configured to calculate first and second temperature values based on signals from the first and second temperature sensitive elements, perform a heat flux calculation using the first and second temperature values and the known thermal conductivity of the spacer, and provide a process fluid temperature output in accordance with the process communication protocol using the communication circuitry, the process fluid temperature output being based on the heat flux and the first and second temperatures.

2. The process fluid temperature measurement system of claim 1, wherein the heat flux calculation is based on thermal conductivity of the distal end of the thermowell and thermal conductivity of the spacer between the first and second temperature sensitive elements.

3. The process fluid temperature measurement system of claim 2, wherein the heat flux calculation is based on a ratio of the thermal conductivity of the distal end of the thermowell to the thermal conductivity of the spacer.

4. The process fluid temperature measurement system of claim 3, wherein the heat flux calculation is based on temperature measured by the first temperature sensitive element added to a quantity that is a difference in measurements between the first and second temperature sensitive elements multiplied by the ratio.

5. The process fluid temperature measurement system of claim 1, wherein powder is magnesium oxide.

6. The process fluid temperature measurement system of claim 1, wherein the thermally-insulative collar has internal threads configured to engage the thermowell and external threads configured to engage the conduit wall, and wherein the thermally-insulative collar has a thermal conductivity that is less than the thermal conductivity of the thermowell.

7. A method of detecting process fluid temperature within a conduit, the method comprising:
coupling a thermally-insulative collar to a wall of the conduit;

coupling a thermowell to the thermally-insulative collar wherein the thermowell extends through the wall of the conduit;

sensing, using measurement circuitry of a process fluid temperature transmitter, a first temperature using a first temperature sensitive element disposed within the thermowell at a position spaced from a wall of the thermowell sensing, using the measurement circuitry of the process fluid temperature transmitter, a second temperature using a second temperature sensitive element in contact with a distal end with the thermowell, the second temperature sensitive element being spaced from the first temperature sensitive element by a spacer formed of powder and having a known thermal conductivity; and calculating, using a microprocessor of the process fluid temperature transmitter, a heat flux using the first and second sensed temperatures and known thermal conductivity; and providing a process fluid temperature output in accordance with a process communication protocol, the process fluid temperature output being based on the heat flux and the first and second temperatures.

8. The method of claim 7, wherein the powder is magnesium oxide.

9. The method of claim 7, wherein the process fluid temperature output is provided using communication circuitry of the process fluid temperature transmitter.

10. The method of claim 9, wherein the process fluid temperature output is provided over a wired process communication channel.

11. The method of claim 9, wherein the process fluid temperature output is provided wirelessly.

\* \* \* \* \*